United States Patent
Eom et al.

(10) Patent No.: US 12,235,663 B2
(45) Date of Patent: Feb. 25, 2025

(54) APPARATUS FOR CONTROLLING FLOW RATE AND METHOD OF CONTROLLING FLOW RATE

(71) Applicant: SEMES CO., LTD., Chungcheongnam-do (KR)

(72) Inventors: Myung Hwan Eom, Gyeonggi-do (KR); Sang Hyun Son, Busan (KR); Jae Hong Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 521 days.

(21) Appl. No.: 17/742,281

(22) Filed: May 11, 2022

(65) Prior Publication Data
US 2023/0106044 A1    Apr. 6, 2023

(30) Foreign Application Priority Data

Oct. 1, 2021    (KR) .................. 10-2021-0130553

(51) Int. Cl.
| G05D 7/06 | (2006.01) |
| G01F 1/667 | (2022.01) |
| G05B 19/416 | (2006.01) |

(52) U.S. Cl.
CPC ............ *G05D 7/0623* (2013.01); *G01F 1/667* (2013.01); *G05B 19/416* (2013.01); *G05D 7/0635* (2013.01); *G05B 2219/37371* (2013.01)

(58) Field of Classification Search
CPC ........ G05B 19/416; G05B 2219/37371; G01F 1/667
See application file for complete search history.

(56) References Cited

U.S. PATENT DOCUMENTS 6,644,129 B1 * 11/2003 Shiba ...................... G01F 1/667
                                          73/861.27
7,296,482 B2 * 11/2007 Schaffer .................. G01F 1/667
                                          73/861
(Continued)

FOREIGN PATENT DOCUMENTS

| JP | 2020-190511 | 11/2020 |
| KR | 10-2008-0029958 | 4/2008 |
| KR | 20180005111 A * | 1/2015 |

(Continued)

*Primary Examiner* — Ronald D Hartman, Jr.
(74) *Attorney, Agent, or Firm* — WOMBLE BOND DICKINSON (US) LLP

(57) ABSTRACT

A flow rate control apparatus with improved reliability is provided. The flow rate control apparatus comprises a flow rate measuring unit for measuring a flow rate of chemical solution in a chemical solution supply line, a flow rate control unit for comparing a preset target flow rate profile and an applied flow rate profile, and controlling the flow rate of the chemical solution so that the applied flow rate profile matches the target flow rate profile, and a processor for switching the flow rate control unit to a first mode in response to a signal for the flow rate of the chemical solution measured by the flow rate measuring unit being less than a preset level, wherein, in the first mode, the applied flow rate profile includes a profile of a flow rate estimation model simulated using a flow rate of chemical solution measured by the flow rate measuring unit.

20 Claims, 11 Drawing Sheets

(56) References Cited

U.S. PATENT DOCUMENTS

| | | | |
|---|---|---|---|
| 9,454,158 B2 * | 9/2016 | Somani | G01F 1/68 |
| 2009/0035121 A1 * | 2/2009 | Watson | F01C 1/126 |
| | | | 73/861.87 |

FOREIGN PATENT DOCUMENTS

| | | | | |
|---|---|---|---|---|
| KR | 10-2021-0083172 | | 7/2021 | |
| TW | 202138763 A | * | 10/2021 | ............. G01F 1/206 |

* cited by examiner

APPARATUS FOR CONTROLLING FLOW
RATE AND METHOD OF CONTROLLING
FLOW RATE

This application claims the benefit of Korean Patent Application No. 10-2021-0130553, filed on Oct. 1, 2021, in the Korean Intellectual Property Office, the disclosure of which is incorporated herein by reference in its entirety.

BACKGROUND

1. Field

The present disclosure relates to a flow rate control apparatus and a flow rate control method.

2. Description of the Related Art

In general, semiconductor and flat panel display manufacturing processes process a deposition process, a coating process, a cleaning process, an etching process, etc. using various chemical solutions. These processes use, for example, a chemical solution such as pure water, an etchant, a developer, a cleaning solution, and a mixed solution in which the chemical solutions are mixed. To this end, the substrate processing apparatus is connected to the chemical solution supply device in order to receive various chemical solutions stably.

For example, in the substrate processing apparatus, a flowmeter is installed in a supply line connected to the chemical solution supply device and supplying the chemical solution. These types of flowmeters have been developed in various ways, and the ones that are actually widely used in industrial fields are differential pressure flowmeters, electromagnetic flowmeters, positive displacement flowmeters, ultrasonic flowmeters, and the like. Among them, the ultrasonic flowmeter has the advantages of measuring the flow rate from the outside of the flowmeter without a stage, and having the same accuracy as the electromagnetic flowmeter, so it is widely used.

The ultrasonic flowmeter transmits and receives an ultrasonic signal (or an ultrasonic beam) from an ultrasonic sensor and calculates the time difference to measure the flow rate. The ultrasonic flowmeter measures the flow rate of the fluid using the measured flow rate. At this time, the ultrasonic sensor converts the measured ultrasonic signal into an electrical signal to measure the flow rate. However, in the ultrasonic flowmeter, microbubbles contained in the fluid are collected around the ultrasonic sensor, particularly, in the measurement region that receives the ultrasonic wave, thereby reducing the measurement sensitivity of the ultrasonic sensor, which causes an error in the measurement data.

SUMMARY

An object of the present disclosure is to provide a flow rate control apparatus with improved reliability.

Another object of the present disclosure is to provide a method for controlling a flow rate with improved reliability.

The objects of the present disclosure are not limited to the objects mentioned above, and other objects not mentioned will be clearly understood by those skilled in the art from the following description.

One aspect of the flow rate control apparatus according to the present disclosure for achieving the above technical object comprises a flow rate measuring unit for measuring a flow rate of chemical solution in a chemical solution supply line, a flow rate control unit for comparing a preset target flow rate profile and an applied flow rate profile, and controlling the flow rate of the chemical solution so that the applied flow rate profile matches the target flow rate profile, and a processor for switching the flow rate control unit to a first mode in response to a signal for the flow rate of the chemical solution measured by the flow rate measuring unit being less than a preset level, wherein, in the first mode, the applied flow rate profile includes a profile of a flow rate estimation model simulated using a flow rate of chemical solution measured by the flow rate measuring unit.

Wherein the flow rate measuring unit comprises a first ultrasonic sensor for oscillating an ultrasonic wave in a positive direction with respect to a supply direction of chemical solution at a position corresponding to one end of the chemical solution supply line, and a second ultrasonic sensor for oscillating an ultrasonic wave in an opposite direction with respect to a supply direction of chemical solution at a position corresponding to the other end of the chemical solution supply line, wherein the flow rate of the chemical solution is measured based on an ultrasonic signal transmitted and received by the first ultrasonic sensor and the second ultrasonic sensor.

Wherein the flow rate control unit comprises a proportional-integral-differential (PID) controller for generating a flow rate control signal according to a difference between the applied flow rate profile and the target flow rate profile, a current converting unit for receiving the flow rate control signal of the PID controller and converting it into a valve control current, and a constant pressure valve for adjusting the flow rate of the chemical solution based on the valve control current provided from the current converting unit.

Wherein the processor switches the flow rate control unit to a second mode in response to a signal for the flow rate of the chemical solution measured by the flow rate measuring unit being equal to or greater than a preset level, wherein, in the second mode, the applied flow rate profile includes a profile of an actual measured flow rate measured by the flow rate measuring unit.

Wherein the processor applies a smoothing switching algorithm in response to switching between the first mode and the second mode.

Wherein the smoothing switching algorithm applies a membership function.

Wherein the membership function is designed by applying a center average method.

Wherein the flow rate estimation model is calculated by applying a flow rate of chemical solution measured by the flow rate measuring unit to polynomial regression analysis.

The flow rate control apparatus further comprises a memory for storing the flow rate estimation model.

Another aspect of the flow rate control apparatus according to the present disclosure for achieving the above technical object comprises a flow rate measuring unit for measuring a flow rate of chemical solution using an ultrasonic sensor, a flow rate control unit for comparing a preset target flow rate profile and an applied flow rate profile, and providing a flow rate control signal so that the applied flow rate profile matches the target flow rate profile, a current converting unit for converting current according to the flow rate control signal provided by the flow rate control unit, and a constant pressure valve for receiving current provided by the current converting unit and adjusting a flow rate of chemical solution, wherein the applied flow rate profile, in a first mode, comprises a profile of a flow rate estimation model simulated with experimental data of a flow rate of chemical solution, wherein the applied flow rate profile, in a second mode, comprises a profile of an actual measured flow rate measured by the flow rate measuring unit.

The flow rate control apparatus further comprises a processor for switching the first mode and the second mode, wherein the processor switches the first mode and the second mode by applying a smoothing switching algorithm.

Wherein the processor switches to the first mode in response to an ultrasonic signal pulse generated by the ultrasonic sensor being less than a threshold value, wherein the processor switches to the second mode in response to the ultrasonic signal pulse being equal to or greater than the threshold value.

Wherein the smoothing switching algorithm applies a membership function designed using a center average method.

Wherein the flow rate control unit comprises a PID controller.

Wherein the flow rate estimation model is calculated by applying a flow rate of chemical solution measured by the flow rate measuring unit to polynomial regression analysis.

One aspect of the flow rate control method according to the present disclosure for achieving the above technical object comprises measuring a flow rate of chemical solution in a chemical solution supply line, comparing a target flow rate profile and an applied flow rate profile, and controlling the flow rate of the chemical solution so that the applied flow rate profile matches the target flow rate profile, wherein controlling the flow rate of the chemical solution comprises, in response to a signal for the flow rate of the chemical solution being less than a threshold level, applying a profile of a flow rate estimation model simulated using experimental data on an actual measured flow rate of chemical solution, as the applied flow rate profile.

Wherein controlling the flow rate of the chemical solution further comprises, in response to a signal for the flow rate of the chemical solution being equal to or greater than a threshold level, applying a profile of an actual measured flow rate measured with respect to chemical solution in the chemical solution supply line, as the applied flow rate profile.

Wherein controlling the flow rate of the chemical solution further comprises applying a smoothing switching algorithm in response to switching the applied flow rate profile between the profile of the flow rate estimation model and the profile of the actual measured flow rate.

Wherein controlling the flow rate of the chemical solution further comprises switching the applied flow rate profile between the profile of the flow rate estimation model and the profile of the actual measured flow rate within one second.

Wherein controlling the flow rate of the chemical solution comprises generating a flow rate control signal according to a difference between the applied flow rate profile and the target flow rate profile, converting the flow rate control signal into a valve control current of a corresponding level, and adjusting the flow rate of the chemical solution using a constant pressure valve based on the valve control current.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
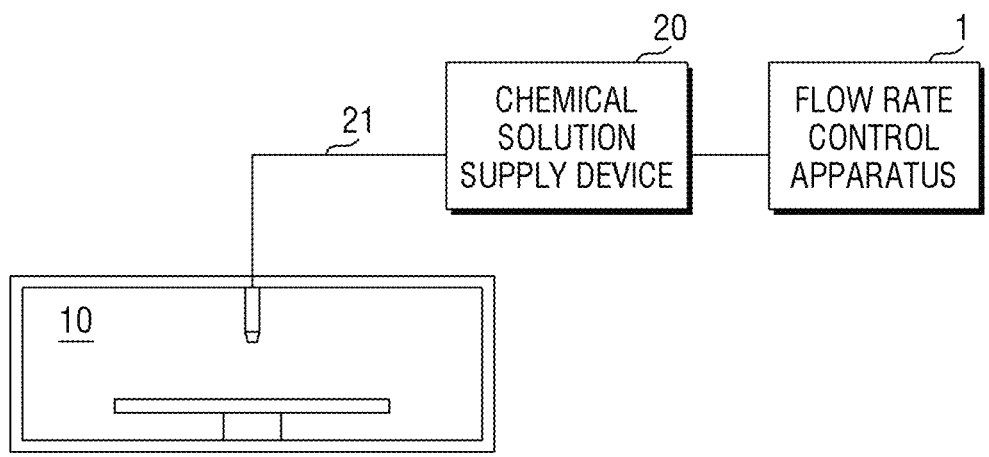
FIG. 1 is a conceptual diagram for describing a flow rate control apparatus according to an embodiment of the present disclosure.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

When an element or layer is referred as being located "on" another element or layer, it includes not only being located directly on the other element or layer, but also with intervening other layers or elements. On the other hand, when an element is referred as being "directly on" or "immediately on," it indicates that no intervening element or layer is interposed.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

The terminology used herein is for the purpose of describing the embodiments and is not intended to limit the present disclosure. In the present disclosure, the singular also includes the plural, unless specifically stated otherwise in the phrase. As used herein, "comprises" and/or "comprising" refers to that components, steps, operations and/or elements mentioned does not exclude the presence or addition of one or more other components, steps, operations and/or elements.

Unless otherwise defined, all terms (including technical and scientific terms) used herein may be used with the meaning commonly understood by those of ordinary skill in the art to which the present disclosure belongs. In addition, terms defined in a commonly used dictionary are not to be interpreted ideally or excessively unless clearly defined in particular.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

FIG. 1 is a conceptual diagram for describing a flow rate control apparatus according to an embodiment of the present disclosure.

Referring to FIG. 1, the flow rate control apparatus 1 controls the flow rate of the chemical solution provided to the process chamber 10. Specifically, when the chemical solution supply device 20 supplies the chemical solution to the process chamber 10, the flow rate control apparatus 1 controls the flow rate of the chemical solution in the chemical solution supply line 21.

The flow rate control apparatus 1 controls the flow rate of the chemical solution based on a target flow rate profile required in a process performed by the process chamber 10. When there are a plurality of chemical solution supply lines 21 for supplying a chemical solution to the process chamber 10, a plurality of target flow rate profiles may be used.

Figure 2:
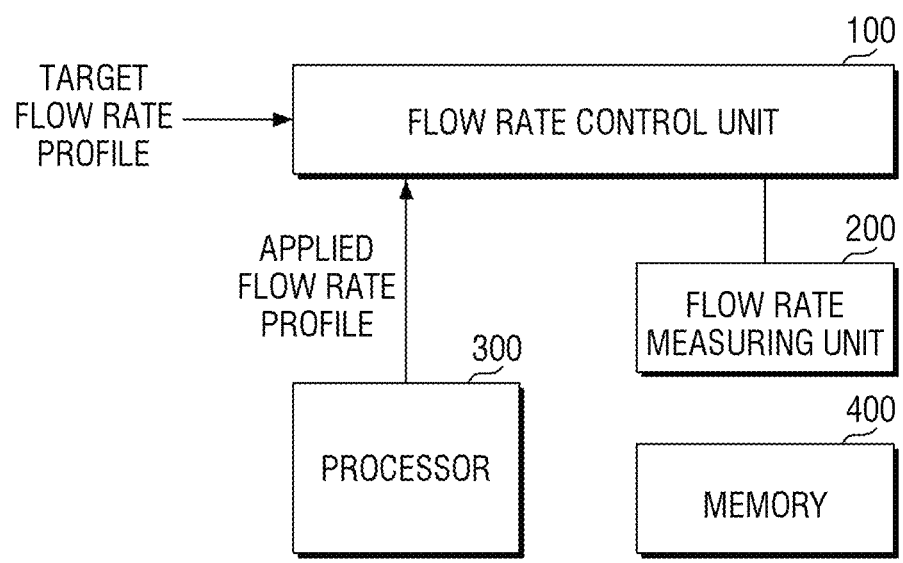
FIG. 2 is a view showing a flow rate control apparatus according to an embodiment of the present disclosure.
Figure 3:
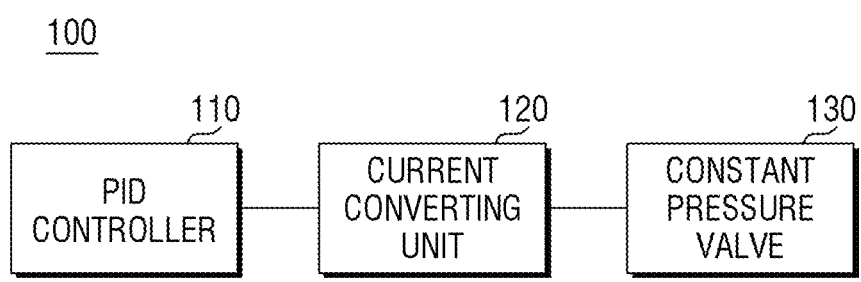
FIG. 3 is a diagram illustrating a flow rate control unit of a flow rate control apparatus according to an embodiment of the present disclosure.
Figure 4:
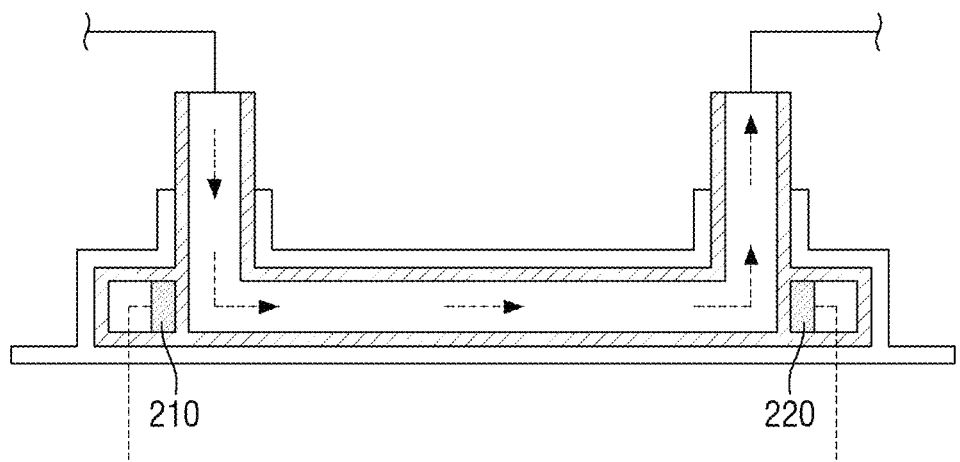
FIG. 4 is a diagram illustrating a flow rate measuring unit of a flow rate control apparatus according to an embodiment of the present disclosure.

FIG. 2 is a view showing a flow rate control apparatus according to an embodiment of the present disclosure. FIG. 3 is a diagram illustrating a flow rate control unit of a flow rate control apparatus according to an embodiment of the present disclosure. FIG. 4 is a diagram illustrating a flow rate measuring unit of a flow rate control apparatus according to an embodiment of the present disclosure.

Referring to FIGS. 2 to 4, the flow rate control apparatus 1 may comprise a flow rate control unit 100, a flow rate measuring unit 200, a processor 300, and a memory 400.

The flow rate control unit 100 substantially adjusts the flow rate of the chemical solution controlled by the flow rate control apparatus 1 to control it. The flow rate control unit 100 may include a proportion integral derivation (PID) controller 110, a current converting unit 120, and a constant pressure valve 130.

The PID controller 110 compares the target flow rate profile with the applied flow rate profile, and controls the flow rate of the chemical solution so that the flow rate of the chemical solution currently being supplied to the process matches the target flow rate profile.

Specifically, the PID controller 110 may perform proportional control, integral control, and differential control. The proportional control calculates the target flow rate profile and the applied flow rate profile, and calculates the control amount in proportion to the difference value therebetween. When the target value is not reached by proportional control, the integral control integrates the deviation and add it to the control amount. The differential control allows the control unit to reach the target value more quickly and flexibly by giving a control value to the amount of change in the deviation of the target value.

A target flow rate profile may be input to the PID controller 110. The PID controller 110 may provide a flow rate control signal to the current converting unit according to the input target flow rate profile.

The current converting unit 120 may receive a flow rate control signal from the PID controller 110 and convert the current provided to the constant pressure valve 130. That is, the current converting unit 120 may control the constant pressure valve 130 according to the flow rate control signal provided from the PID controller 110 by converting the level of the current input to the constant pressure valve 130.

The constant pressure valve 130 adjusts the flow rate of the chemical solution according to the opening rate. The opening rate of the constant pressure valve 130 may be adjusted by the current level of the current converting unit 120. Specifically, the opening rate of the constant pressure valve 130 may control the flow rate of the chemical solution by receiving air of a different pressure and adjusting the opening rate according to the current level of the current converting unit 120.

The constant pressure valve 130 may adjust the flow rate of the chemical solution by a fixed amount supply method and a feedback supply method. The fixed amount supply method is a method of maintaining a constant flow rate of the chemical solution by fixing the opening rate of the constant pressure valve 130. The feedback supply method is a method of controlling the flow rate of the chemical solution by measuring the flow rate of the chemical solution in real time and adjusting the opening rate of the constant pressure valve 130 in real time according to the measured value.

When the flow rate of the supplied chemical solution is required to be controlled in real time, the constant pressure valve 130 may control the flow rate of the chemical solution through a feedback supply method. For example, when the target flow rate profile is not constant and the flow rate is changed over time, the constant pressure valve 130 may control the flow rate of the chemical solution in a feedback supply method so that the applied flow rate profile matches the target flow rate profile.

Although not shown in FIG. 3, the flow rate control unit 100 may include an electropneumatic regulator. For example, the electropneumatic regulator may be disposed between the current converting unit 120 and the constant pressure valve 130. The electropneumatic regulator may adjust the opening rate of the constant pressure valve 130 by supplying air to the constant pressure valve 130 according to the level of the current provided from the current converting unit 120. The electropneumatic regulator may output air of different pressures based on the magnitude of the analog electrical signal applied from the current converting unit 120.

The flow rate measuring unit 200 may measure the flow rate of the supplied chemical solution. In some embodiments, the flow rate measuring unit 200 may measure the flow rate of the chemical solution using an ultrasonic flow rate sensor. The flow rate measuring unit 200 may include a first ultrasonic sensor 210 and a second ultrasonic sensor 220.

The first ultrasonic sensor 210 and the second ultrasonic sensor 220 provide ultrasonic waves to the flowing chemical solution. The first ultrasonic sensor 210 oscillates ultrasonic waves in a positive direction with respect to the supply direction of the chemical solution. The first ultrasonic sensor 210 may be located at one end of the chemical solution supply line. The second ultrasonic sensor 220 oscillates ultrasonic waves in an opposite direction with respect to the supply direction of the chemical solution. The second ultrasonic sensor 220 may be located at the other end of the chemical solution supply line. The second ultrasonic sensor 220 may receive the ultrasonic wave oscillated from the first ultrasonic sensor 210, and the first ultrasonic sensor 210 may receive the ultrasonic wave oscillated from the second ultrasonic sensor 220.

The flow rate measuring unit 200 may measure the flow rate of the chemical solution using the level of the ultrasonic waves transmitted and received by the first ultrasonic sensor 210 and the second ultrasonic sensor 220. Specifically, by measuring the propagation time generated by the ultrasonic waves provided by the first ultrasonic sensor 210 and the second ultrasonic sensor 220 passing through the chemical solution in the chemical solution supply line, the propagation time and the distance between the first ultrasonic sensor 210 and the second ultrasonic sensor 220 may be used to measure the flow rate of the chemical solution.

The processor 300 may control the overall operation of the flow rate control apparatus 1. The processor 300 may control the flow rate control unit 100, the flow rate measuring unit 200, and the memory 400. The processor 300 may provide the flow rate profile provided from the flow rate measuring unit 200 or the memory 400 to the flow rate control unit 100 as an applied flow rate profile.

The memory 400 may store data necessary for the flow rate control apparatus 1 to control the flow rate of the chemical solution. For example, the memory 400 may store data regarding a target flow rate profile and a flow rate estimation model that may be the applied flow rate profile. The memory 400 may provide stored data to the processor 300.

Figure 5:
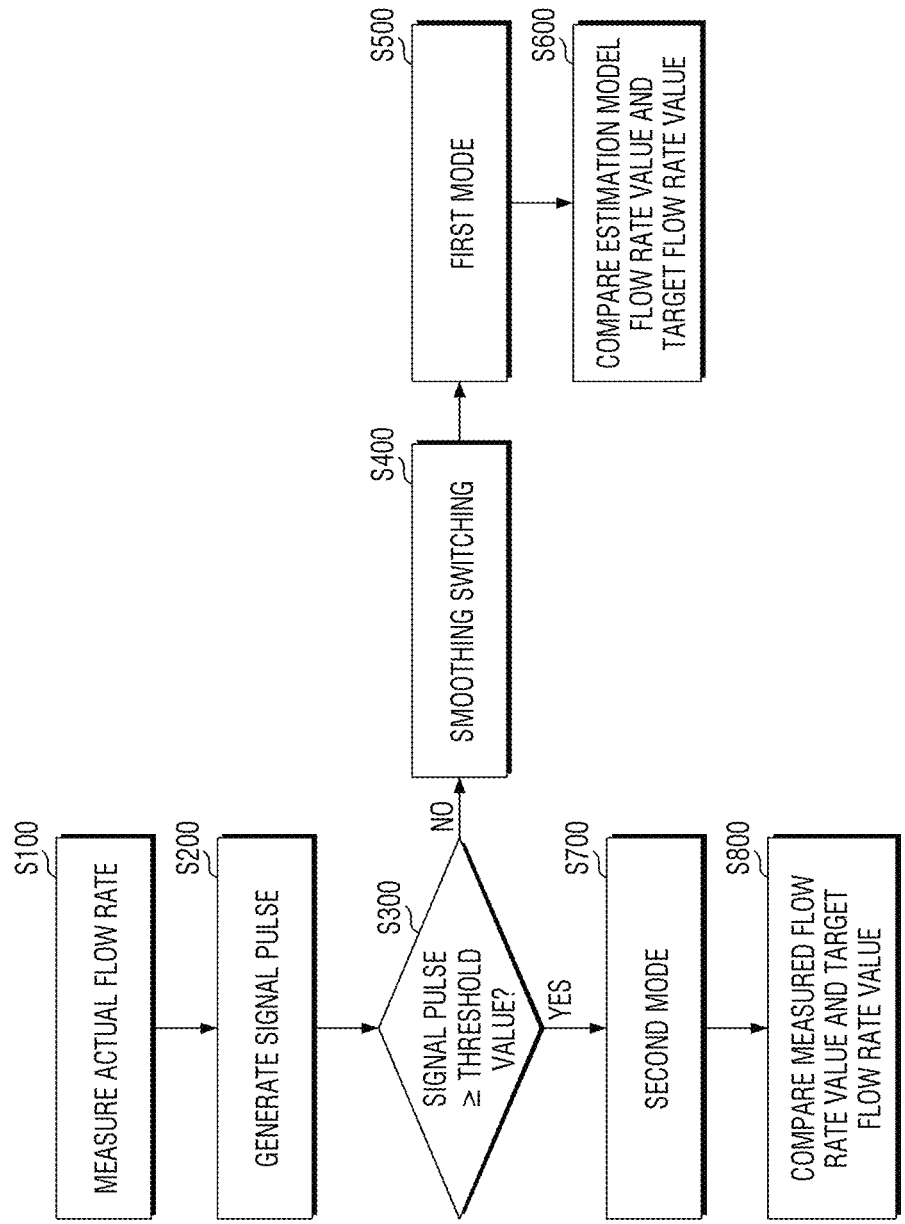
FIG. 5 is a flowchart for describing the operation of the flow rate control apparatus according to an embodiment of the present disclosure.
Figure 6:
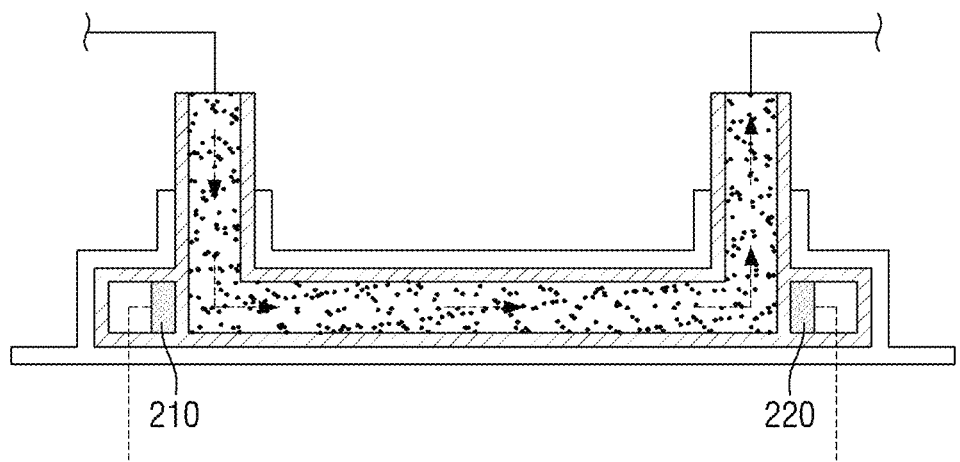
FIG. 6 is a view for describing the operation of the flow rate control apparatus according to an embodiment of the present disclosure.
Figure 7:
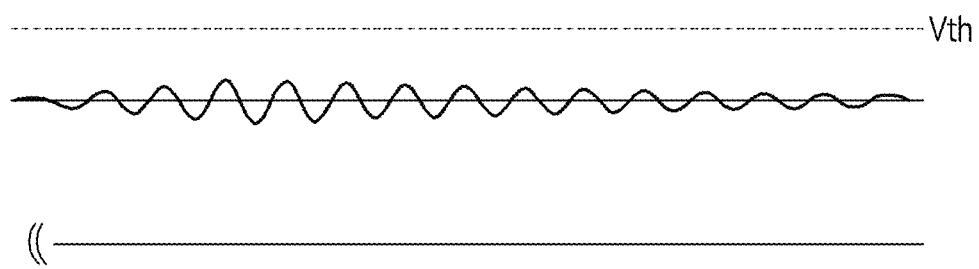
FIG. 7 is a view for describing the operation of the flow rate control apparatus according to an embodiment of the present disclosure.
Figure 8:
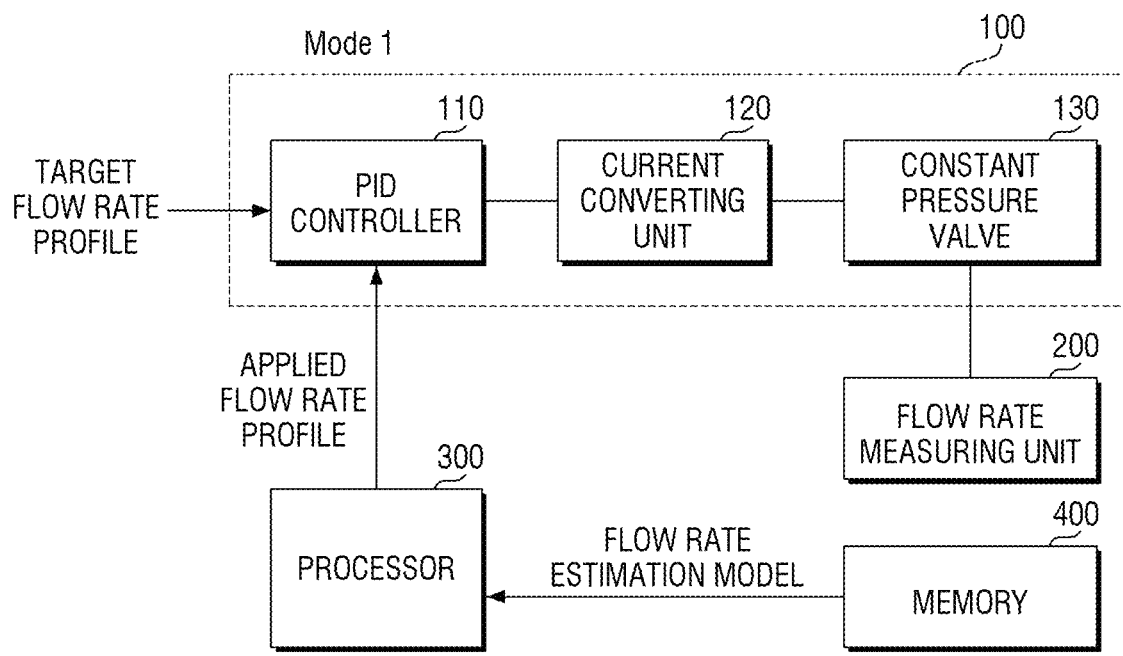
FIG. 8 is a view for describing the operation of the flow rate control apparatus according to an embodiment of the present disclosure.
Figure 9:
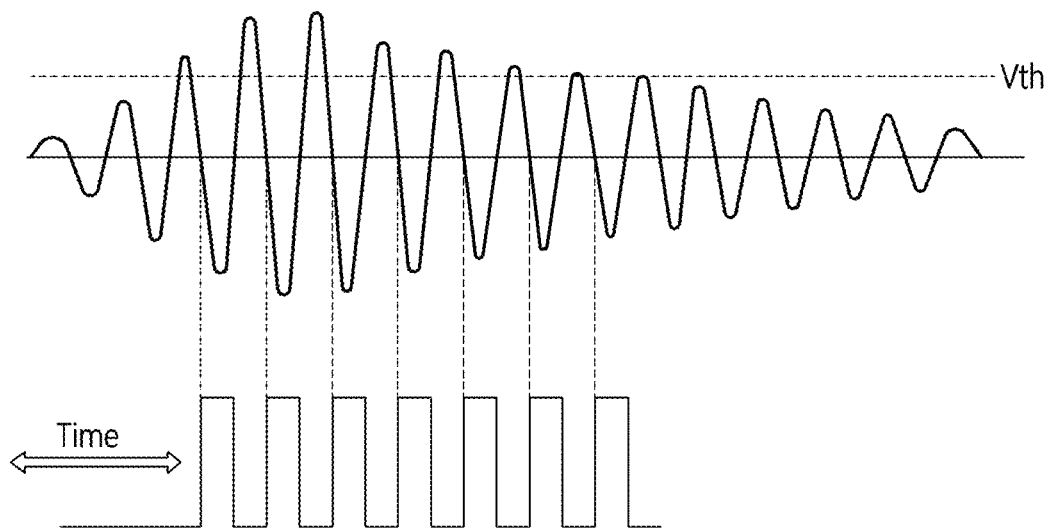
FIG. 9 is a view for describing the operation of the flow rate control apparatus according to an embodiment of the present disclosure.
Figure 10:
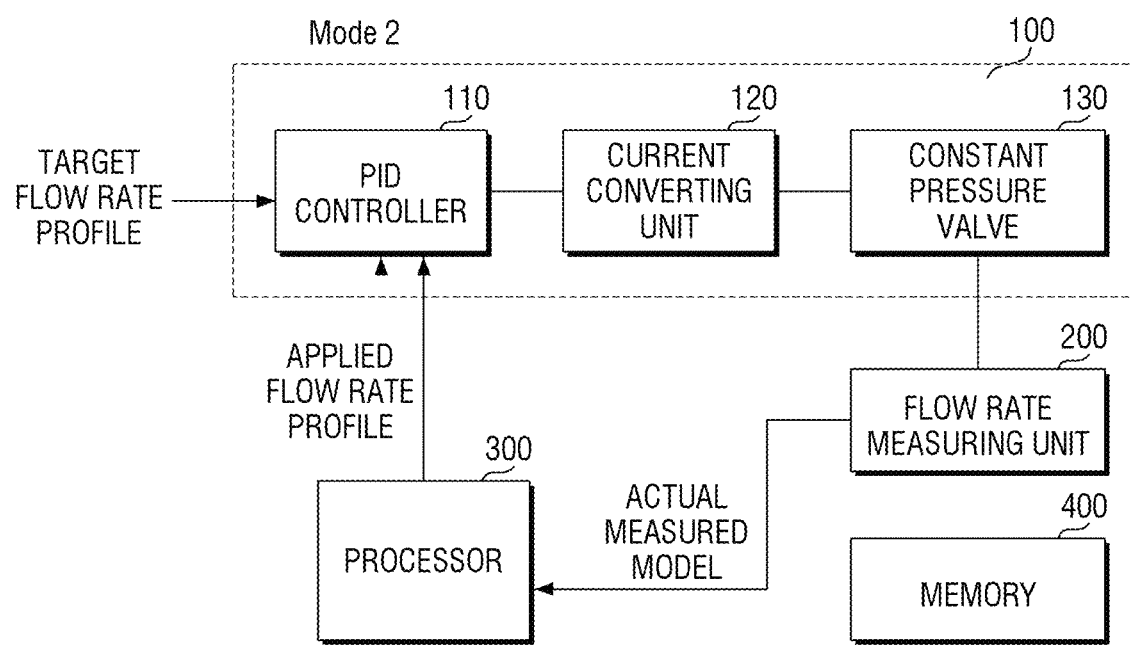
FIG. 10 is a view for describing the operation of the flow rate control apparatus according to an embodiment of the present disclosure.

FIG. 5 is a flowchart for describing the operation of the flow rate control apparatus according to an embodiment of the present disclosure. FIG. 6 is a view for describing the operation of the flow rate control apparatus according to an embodiment of the present disclosure. FIG. 7 is a view for describing the operation of the flow rate control apparatus according to an embodiment of the present disclosure. FIG. 8 is a view for describing the operation of the flow rate control apparatus according to an embodiment of the present disclosure. FIG. 9 is a view for describing the operation of the flow rate control apparatus according to an embodiment of the present disclosure. FIG. 10 is a view for describing the operation of the flow rate control apparatus according to an embodiment of the present disclosure.

Referring to FIG. 5, the flow rate control apparatus 1 measures the actual flow rate flowing in the chemical solution supply line (S100). Then, the flow rate control apparatus 1 generates a signal pulse according to the measured flow rate of the chemical solution in the chemical solution supply line (S200).

Specifically, referring to FIGS. 4, 8, and 9, the flow rate measuring unit 200 of the flow rate control apparatus 1 may measure the flow rate of the chemical solution in the chemical solution supply line.

When the level of the ultrasonic signal transmitted and received by the first ultrasonic sensor 210 and the second ultrasonic sensor 220 of the flow rate measuring unit 200 exceeds the threshold level Vth, the flow rate measuring unit 200 may generate a signal pulse for the ultrasonic signal transmitted and received by the first ultrasonic sensor 210 and the second ultrasonic sensor 220.

The flow rate measuring unit 200 may consider the time from when the first ultrasonic signal is generated to the time when the first signal pulse is generated as the time that the chemical solution moves between the first ultrasonic sensor 210 and the second ultrasonic sensor 220, and calculate the flow rate of the chemical solution. In some embodiments, the flow rate measuring unit 200 may calculate the flow rate of the chemical solution flowing between the first ultrasonic sensor 210 and the second ultrasonic sensor 220 when the signal pulse is generated three or more times.

Referring back to FIG. 5, the flow rate control apparatus 1 compares the signal pulse generated by the flow rate measuring unit 200 with a threshold value (S300). In some embodiments, the threshold value may include three pulses. However, the embodiment is not limited thereto.

Next, when the signal pulse generated by the flow rate measuring unit 200 is less than the threshold value, the flow rate control apparatus 1 performs smoothing switching to switch the mode (S400). Then, the flow rate control apparatus 1 switches to the first mode (S500).

Specifically, referring to FIGS. 6 to 8, when bubbles are included in the chemical solution flowing between the first ultrasonic sensor 210 and the second ultrasonic sensor 220 of the flow rate measuring unit 200, the level of the ultrasonic signal transmitted and received by the first ultrasonic sensor 210 and the second ultrasonic sensor 220 does not exceed the threshold level Vth. When the level of the ultrasonic signal transmitted and received by the first ultrasonic sensor 210 and the second ultrasonic sensor 220 does not exceed the threshold level Vth, the flow rate measuring unit 200 does not generate a signal pulse. Accordingly, when the signal pulse is less than the threshold value, the processor 300 may switch the flow rate control unit 100 to the first mode (Mode 1).

The smoothing switching is to prevent an error from occurring due to abrupt switching when the flow rate control apparatus 1 switches modes. Specifically, since the first mode (Mode 1) is to compare the flow rate estimation model with the target flow rate profile as described below, if the flow rate is controlled by comparing the actual measured flow rate with the target flow rate profile, and then the flow rate estimation model is compared with the target flow rate profile through mode switching, hunting or control divergence may occur due to a difference between the actual measured flow rate value and the estimated flow rate value of the flow rate estimation model. Accordingly, a smoothing switching is required to avoid an abrupt mode switching.

In some embodiments, the processor 300 may control the flow rate control unit 100 to switch the mode through a smoothing switching algorithm. The smoothing switching algorithm may be designed to smoothly switch modes within a predetermined time by applying a membership function to give a weight to a switched signal. In addition, the smoothing switching algorithm may be designed to minimize the effects of hunting or control divergence through smooth mode switching using a center average method.

In some embodiments, the flow rate control apparatus 1 can switch modes smoothly within one second without errors through smoothing switching. That is, when the flow rate control apparatus 1 is switched to the first mode (Mode 1), by using the smoothing switching algorithm, it is possible to switch the mode without error even if there is a difference between the actual measured flow rate value and the flow rate value of the flow rate estimation model.

Then, referring back to FIG. 5, the flow rate control apparatus 1 compares the profile of the flow rate estimation model with the target flow rate profile (S600).

Specifically, referring to FIG. 8, the processor 300 receives the flow rate estimation model stored in the memory 400, and provides the flow rate estimation model as the applied flow rate profile to the flow rate control unit 100. The PID controller 110 may compare the profile of the flow rate estimation model provided from the processor 300 with the target flow rate profile. The PID controller 110 may provide a flow rate control signal to the current converting unit 120 to control the flow rate of the chemical solution based on the profile of the flow rate estimation model.

That is, in the first mode (Mode 1), it is assumed that the flow rate of the chemical solution provided from the flow rate control apparatus 1 follows the profile of the flow rate estimation model in a state, in which the flow rate measuring unit 200 cannot measure the flow rate, such as when bubbles are included in the flowing chemical solution. The flow rate control apparatus 1 does not control the flow rate by comparing the actual measured flow rate with the target flow rate profile, but controls the flow rate of the chemical solution actually being supplied by comparing the flow rate estimation model with the target flow rate profile. Accordingly, even when the flow rate of the chemical solution cannot be measured, the flow rate can be stably controlled.

Then, referring back to FIG. 5, when the signal pulse is equal to or greater than the threshold value, the flow rate control apparatus 1 is switched to the second mode (S700).

Specifically, referring to FIGS. 9 and 10, when the signal pulse generated by the flow rate measuring unit 200 is equal to or greater than a threshold value, the processor 300 may switch the flow rate control unit 100 to the second mode. In FIG. 5, it is not illustrated that smoothing switching is performed when switching to the second mode (Mode 2), but the flow rate control apparatus 1 may perform smoothing switching even when switching to the second mode (Mode 2). That is, when the mode is switched between the first mode (Mode 1) and the second mode (Mode 2), the flow rate control apparatus 1 may use the smoothing switching algorithm to prevent errors due to abrupt mode switching.

Then, referring back to FIG. 5, the flow rate control apparatus 1 compares the actual measured flow rate profile measured by the flow rate measuring unit 200 with the target flow rate profile (S800).

Specifically, referring to FIG. 10, the processor 300 may provide the profile of the actual measured flow rate, in which the flow rate measuring unit 200 directly measures the flow rate of the chemical solution being supplied, to the flow rate control unit 100, as the applied flow rate profile. The PID controller 110 may compare the profile of the actual measured flow rate, which is the applied flow rate profile provided from the processor 300, with the target flow rate profile. The PID controller 110 may provide a flow rate control signal to the current converting unit 120 to control the flow rate of the chemical solution based on the profile of the actual measured flow rate.

That is, the second mode (Mode 2) is a state, in which the flow rate of the chemical solution can be normally measured through the flow rate measuring unit 200 as in the case where the flowing chemical solution does not contain bubbles, and in the second mode (Mode 2), the flow rate control apparatus 1 may apply the actual measured flow rate profile measured by the flow rate measuring unit 200 to the applied flow rate profile.

Figure 11:
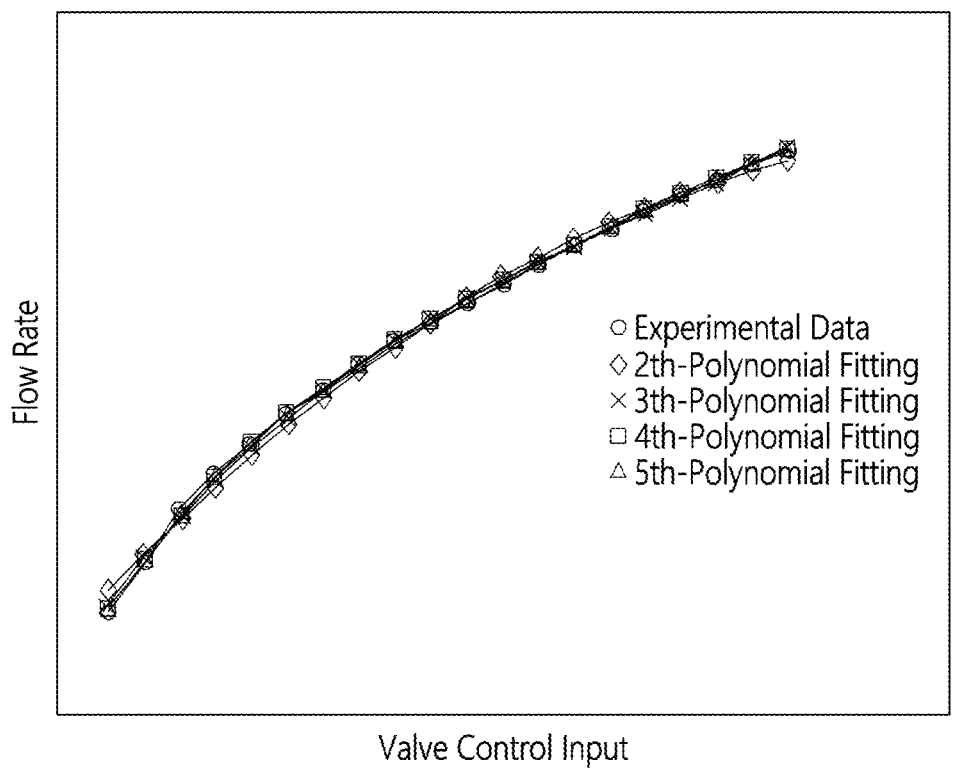
FIG. 11 is a view for describing a flow rate estimation model of a flow rate control apparatus according to an embodiment of the present disclosure.

FIG. 11 is a view for describing a flow rate estimation model of a flow rate control apparatus according to an embodiment of the present disclosure. Specifically, FIG. 11 is a graph illustrating a change in the flow rate of the chemical solution according to the level of the current provided to the constant pressure valve 130.

Referring to FIG. 11, the profile of the flow rate estimation model that the flow rate control unit 100 compares with the target flow rate profile in the first mode (Mode 1) may be generated using experimental data measured by the flow rate measuring unit 200. Specifically, the flow rate estimation model may be generated using the flow rate measured by the flow rate measuring unit 200 according to the current provided from the current converting unit 120 to the constant pressure valve 130. That is, the experimental data used to generate the flow rate estimation model may include the flow rate measured by the flow rate measuring unit 200 according to the current provided from the current converting unit 120 to the constant pressure valve 130.

In some embodiments, the flow rate estimation model may be generated by applying a polynomial regression analysis method to experimental data measuring the flow rate of the chemical solution. At this time, as the number of polynomial regression analysis increases, the flow rate estimation model may approximate the experimental data.

When generating the flow rate estimation model, errors should be minimized in order to increase the accuracy of the flow rate estimation model. In some embodiments, by designing a cost function to minimize the error between the profile of the flow rate estimation model and the profile of the experimental data, the profile of the flow rate estimation model may be adjusted to approximate the profile of the experimental data. For example, when a flow rate estimation model is generated using polynomial regression analysis, a polynomial coefficient that minimizes an error between the profile of the flow rate estimation model and the profile of the experimental data may be set using a cost function. Also, a gradient descent algorithm may be used to optimize the cost function.

Although embodiments of the present disclosure have been described with reference to the above and the accompanying drawings, those skilled in the art, to which the present disclosure pertains, can understand that the present disclosure may be practiced in other specific forms without changing its technical spirit or essential features. Therefore, it should be understood that the embodiments described above are illustrative in all respects and not limiting.

What is claimed is:

1. An apparatus for controlling a flow rate comprising:
    a flow rate measuring unit for measuring a flow rate of chemical solution in a chemical solution supply line;
    a flow rate control unit for comparing a preset target flow rate profile and an applied flow rate profile, and controlling the flow rate of the chemical solution so that the applied flow rate profile matches the target flow rate profile; and a processor for switching the flow rate control unit to a first mode in response to a signal for the flow rate of the chemical solution measured by the flow rate measuring unit being less than a preset level,
  wherein, in the first mode, the applied flow rate profile includes a profile of a flow rate estimation model simulated using a flow rate of chemical solution measured by the flow rate measuring unit.

2. The apparatus of claim 1, wherein the flow rate measuring unit comprises,
  a first ultrasonic sensor for oscillating an ultrasonic wave in a positive direction with respect to a supply direction of chemical solution at a position corresponding to one end of the chemical solution supply line, and
  a second ultrasonic sensor for oscillating an ultrasonic wave in an opposite direction with respect to a supply direction of chemical solution at a position corresponding to the other end of the chemical solution supply line,
  wherein the flow rate of the chemical solution is measured based on an ultrasonic signal transmitted and received by the first ultrasonic sensor and the second ultrasonic sensor.

3. The apparatus of claim 1, wherein the flow rate control unit comprises,
  a proportional-integral-differential (PID) controller for generating a flow rate control signal according to a difference between the applied flow rate profile and the target flow rate profile,
  a current converting unit for receiving the flow rate control signal of the PID controller and converting it into a valve control current, and
  a constant pressure valve for adjusting the flow rate of the chemical solution based on the valve control current provided from the current converting unit.

4. The apparatus of claim 1, wherein the processor switches the flow rate control unit to a second mode in response to a signal for the flow rate of the chemical solution measured by the flow rate measuring unit being equal to or greater than a preset level,
  wherein, in the second mode, the applied flow rate profile includes a profile of an actual measured flow rate measured by the flow rate measuring unit.

5. The apparatus of claim 4, wherein the processor applies a smoothing switching algorithm in response to switching between the first mode and the second mode.

6. The apparatus of claim 5, wherein the smoothing switching algorithm applies a membership function.

7. The apparatus of claim 6, wherein the membership function is designed by applying a center average method.

8. The apparatus of claim 1, wherein the flow rate estimation model is calculated by applying a flow rate of chemical solution measured by the flow rate measuring unit to polynomial regression analysis.

9. The apparatus of claim 1 further comprises,
  a memory for storing the flow rate estimation model.

10. An apparatus for controlling a flow rate comprising:
  a flow rate measuring unit for measuring a flow rate of chemical solution using an ultrasonic sensor;
  a flow rate control unit for comparing a preset target flow rate profile and an applied flow rate profile, and providing a flow rate control signal so that the applied flow rate profile matches the target flow rate profile;
  a current converting unit for converting current according to the flow rate control signal provided by the flow rate control unit; and
  a constant pressure valve for receiving current provided by the current converting unit and adjusting a flow rate of chemical solution,
  wherein the applied flow rate profile, in a first mode, comprises a profile of a flow rate estimation model simulated with experimental data of a flow rate of chemical solution,
  wherein the applied flow rate profile, in a second mode, comprises a profile of an actual measured flow rate measured by the flow rate measuring unit.

11. The apparatus of claim 10 further comprises,
  a processor for switching the first mode and the second mode,
  wherein the processor switches the first mode and the second mode by applying a smoothing switching algorithm.

12. The apparatus of claim 11, wherein the processor switches to the first mode in response to an ultrasonic signal pulse generated by the ultrasonic sensor being less than a threshold value,
  wherein the processor switches to the second mode in response to the ultrasonic signal pulse being equal to or greater than the threshold value.

13. The apparatus of claim 11, wherein the smoothing switching algorithm applies a membership function designed using a center average method.

14. The apparatus of claim 10, wherein the flow rate control unit comprises a PID controller.

15. The apparatus of claim 10, wherein the flow rate estimation model is calculated by applying a flow rate of chemical solution measured by the flow rate measuring unit to polynomial regression analysis.

16. A method for controlling a flow rate comprising:
  measuring a flow rate of chemical solution in a chemical solution supply line;
  comparing a target flow rate profile and an applied flow rate profile; and
  controlling the flow rate of the chemical solution so that the applied flow rate profile matches the target flow rate profile,
  wherein controlling the flow rate of the chemical solution comprises, in response to a signal for the flow rate of the chemical solution being less than a threshold level, applying a profile of a flow rate estimation model simulated using experimental data on an actual measured flow rate of chemical solution, as the applied flow rate profile.

17. The method of claim 16, wherein controlling the flow rate of the chemical solution further comprises, in response to a signal for the flow rate of the chemical solution being equal to or greater than a threshold level, applying a profile of an actual measured flow rate measured with respect to chemical solution in the chemical solution supply line, as the applied flow rate profile.

18. The method of claim 17, wherein controlling the flow rate of the chemical solution further comprises applying a smoothing switching algorithm in response to switching the applied flow rate profile between the profile of the flow rate estimation model and the profile of the actual measured flow rate.

19. The method of claim 17, wherein controlling the flow rate of the chemical solution further comprises switching the applied flow rate profile between the profile of the flow rate estimation model and the profile of the actual measured flow rate within one second.

20. The method of claim 16, wherein controlling the flow rate of the chemical solution comprises, generating a flow rate control signal according to a
difference between the applied flow rate profile and the
target flow rate profile, converting the flow rate control signal into a valve control
current of a corresponding level, and adjusting the flow rate of the chemical solution using a
constant pressure valve based on the valve control
current.

\* \* \* \* \*